March 3, 1959  A. J. CANN  2,876,411
PEAK AMPLITUDE DISCRIMINATOR
Filed Nov. 24, 1954
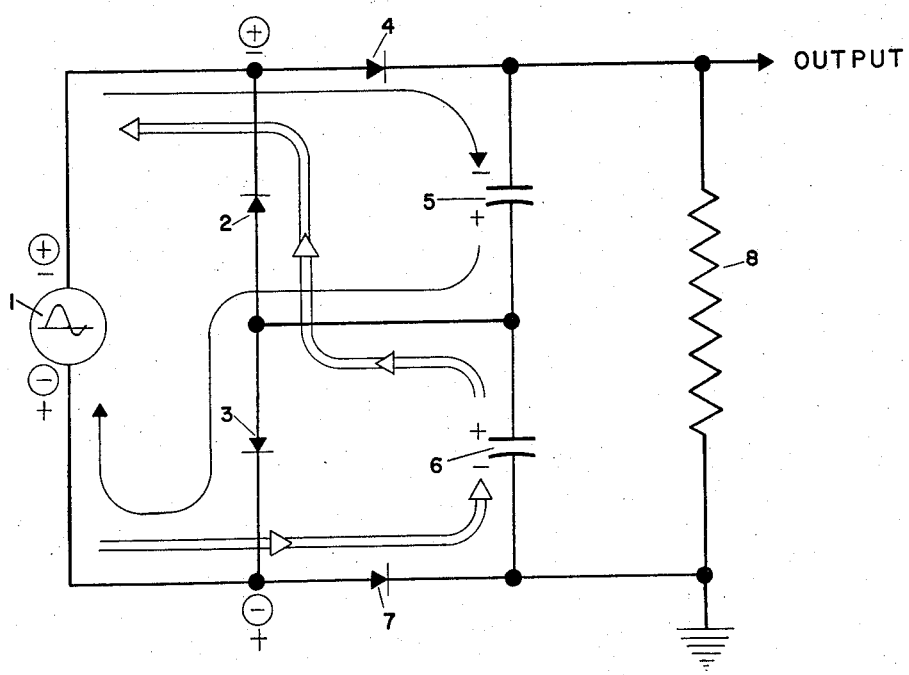
Fig. 1
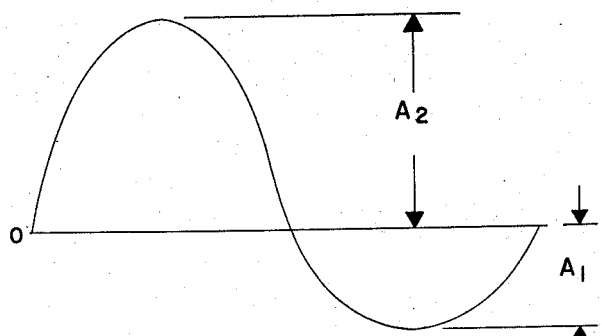
Fig. 2
Alfred J. Cann
*INVENTOR.*

United States Patent Office 2,876,411
Patented Mar. 3, 1959

2,876,411

PEAK AMPLITUDE DISCRIMINATOR

Alfred J. Cann, Nashua, N. H., assignor, by mesne assignments, to Sanders Associates, Inc., Nashua, N. H., a corporation of Delaware Application November 24, 1954, Serial No. 470,920

2 Claims. (Cl. 321—43)

This invention relates to electrical rectifier devices. More particularly, the present invention relates to electrical rectifier devices which convert an electrical alternating voltage into unvarying direct voltage.

There are many situations in the use of electrical and electronic devices wherein an asymmetrical periodic alternating voltage is employed. Such voltages are characterized by unequal positive and negative peak amplitudes. Accordingly, there are various applications where it is desirable to obtain a direct control voltage which is a measure of such differences of such peak amplitudes.

One solution to this problem is presented in a patent in the name of O. C. Traver, #2,114,865, dated April 19, 1938. The Traver patent, however, employs a circuit embodying electromagnetic devices of a very complex character.

The present invention contemplates the use of electrostatic devices in an efficient and simplified structure.

It is therefore an object of the invention to provide an improved peak amplitude discriminator involving a passive network with no mechanically moving parts.

A further object of the invention is to provide a peak amplitude discriminator which is simple in construction and reliable in operation.

Other and further objects of the invention will be apparent from the following description of a preferred embodiment thereof, taken in connection with the accompanying drawings.

In accordance with the present invention there is provided a peak amplitude discriminator which comprises a first and second capacitive means connected in series. A first pair of rectifiers is connected in series opposition to each other and in series with the two capacitive means. A second pair of rectifiers is connected in series opposition to each other and in parallel with the first pair of rectifiers and with the two capacitive means. Means are provided connected to the junctions between the capacitive means and between the second pair of rectifiers, whereby the discriminator converts an input alternating voltage impressed across the second pair of rectifiers into a direct voltage across the two capacitive means. The direct voltage thus produced is proportional to the difference between the negative and positive peak amplitudes of the alternating voltage.

In accordance with the preferred embodiment of the present invention there is provided a peak voltage discriminator which comprises a first and a second capacitor connected in series. A first rectifier, connected in series with the capacitors, permits direct current flow in a first direction. A second rectifier, connected in parallel with the first capacitor and first rectifier and in series with the second capacitor, permits direct current flow through the second capacitor in a second direction opposite the first direction. A third rectifier is connected in series with the capacitors and permits direct current flow in the second direction. A fourth rectifier is connected in parallel with the second capacitor and third rectifier and in series with the first capacitor, and permits direct current flow through the first capacitor in the first direction. A pair of input terminals is connected to the junctions between the first and second rectifiers and between the third and fourth rectifiers. A pair of output terminals is connected to the junctions between the first rectifier and the first capacitor and between the second capacitor and the third rectifier, whereby the discriminator converts an input periodic alternating voltage into an output direct voltage proportional to the difference in peak amplitudes of positive and negative half-cycles of the alternating voltage.

In the accompanying drawings:

Fig. 1 is a schematic circuit diagram of a preferred embodiment of the present invention; and Fig. 2 is a graph of a typical alternating voltage applied to the present invention.

Referring now to the drawings, a source of alternating voltage 1 is connected through a pair of rectifiers 4 and 7 to a pair of capacitors 5 and 6 connected in series as shown. The rectifiers 4 and 7 are connected in series opposition and in series with the capacitors to prevent direct current flow in that circuit. A second pair of rectifiers 2 and 3 are connected in series opposition and in parallel with the first pair of rectifiers and the capacitors as shown.

The junction between the capacitors is connected to the junction between the rectifiers 2 and 3 as shown. A load resistor 8 is connected in parallel with the capacitors. The output direct voltage appears across the resistor 8.

The operation of the invention will be described with reference to an input voltage of the form shown in Fig. 2. The positive peak amplitude $A_2$ of that voltage is greater than the negative peak amplitude $A_1$. When the generator 1 has the polarity as shown encircled, positive at the top and negative at the bottom, the electron current flow at that time is illustrated by the double-lined arrow. The electron flow is precluded in the direction of the rectifier 3 but is permitted in the direction of the rectifier 7. Accordingly, electrons flow from the bottom terminal of the generator 1 through the rectifier 7 and charge the capacitor 6 negatively at the bottom as shown. Electron flow from other plate of the capacitor 6 is precluded through the capacitor 5 by the rectifier 4; hence, the flow is through the junction between the capacitors to the junction between the rectifiers 2 and 3 and upwardly through the rectifier 2 to the positive or top side of the generator 1.

When the polarity of the generated wave is negative on top and positive on the bottom, electron flow is as illustrated by the single-line arrow. Electrons flow from the top of the generator 1 through the rectifier 4 to charge the top plate of the capacitor 5 negatively on top as shown. Electrons flow from the bottom plate of the capacitor 5 through the rectifier 3 to return to the positive or bottom side of the generator 1. It is to be noted that the capacitors 5 and 6 are charge in series opposition relative to the only discharge path through the load resistor 8. Since the voltage across the capacitor 6 is equal to the larger positive amplitude $A_2$ of the input voltage the difference voltage, $A_2-A_1$, appears across the load resistor 8. The output voltage is, of course, positive with respect to ground.

The operating frequency range of the present invention is inherently very large. The RC time constant of the capacitors 5 and 6 and the load resistor 8 may be so chosen as to provide an output voltage substantially equal to the difference in peak amplitudes for frequencies lower than one cycle per second. The capacitors may be readily discharged by grounding the output and connecting a suitable discharge resistor from the junction between the capacitors to ground.

While there has been hereinbefore described what is at present considered a preferred embodiment of the invention, it will be apparent that many and various changes and modifications may be made with respect to the embodiment illustrated, without departing from the spirit of the invention. It will be understood, therefore, that all those changes and modifications as fall fairly within the scope of the present invention, as defined in the appended claims, are to be considered as a part of the present invention.

What is claimed is:

1. A peak amplitude discriminator comprising a first capacitive means; a second capacitive means connected in series with said first means; a first pair of rectifiers connected in series opposition and in series with said two capacitive means; a second pair of rectifiers connected in series opposition and in parallel with said first pair of rectifiers and with said two capacitive means; and means connecting the junctions between said capacitive means and between said second pair of rectifiers, whereby said discriminator converts an input alternating voltage impressed across said second pair of rectifiers to a direct voltage across said two capacitive means, said direct voltage being proportional to the difference between the negative and positive peak amplitudes of said alternating voltage.

2. A peak voltage discriminator comprising a first capacitor; a second capacitor connected in series with said first capacitor; a first rectifier connected in series with said capacitors and permitting direct current flow in a first direction; a second rectifier connected in parallel with said first capacitor and first rectifier, in series with said second capacitor, and permitting direct current flow through said second capacitor in a second direction opposite to said first direction; a third rectifier connected in series with said capacitors and permitting direct current flow in said second direction; a fourth rectifier connected in parallel with said second capacitor and third rectifier, in series with said first capacitor, and permitting a direct current flow through said first capacitor in said first direction; a pair of input terminals connected to the junctions between said first and second rectifiers and between said third and fourth rectifiers; and a pair of output terminals connected to the junctions between said first rectifier and said first capacitor and between said second capacitor and said third rectifier whereby said discriminator converts an input periodic, alternating voltage into an output direct voltage proportional to the difference in peak amplitudes of positive and negative half cycles of said alternating voltage.

References Cited in the file of this patent

UNITED STATES PATENTS

| | | |
|---|---|---|
| 1,973,055 | Fitz Gerald | Sept. 11, 1934 |
| 2,054,125 | Herold | Sept. 15, 1936 |
| 2,270,697 | Clark | Jan. 20, 1942 |
| 2,335,612 | Reiskind | Nov. 30, 1943 |
| 2,403,053 | Conklin | July 2, 1946 |
| 2,485,450 | Kotterman | Oct. 18, 1949 |
| 2,541,093 | Page | Feb. 13, 1951 |
| 2,659,856 | Gannaway | Nov. 17, 1953 |